Figure 1:
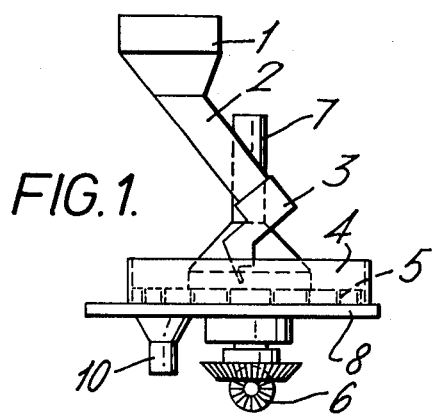

United States Patent [19]

Oyjord

[11] 3,910,217
[45] Oct. 7, 1975

[54] SEED DRILLING MACHINES
[76] Inventor: Egil Oyjord, Ekornveien 35, 1430 As, Norway
[22] Filed: Sept. 5, 1974
[21] Appl. No.: 503,234

Related U.S. Application Data
[63] Continuation of Ser. No. 348,788, April 6, 1973, abandoned.

[30] Foreign Application Priority Data
June 4, 1971 Norway................................ 2127/71
May 25, 1972 Germany........................... 2225420
June 2, 1972 France............................ 72.19964

[52] U.S. Cl.................................. 111/77; 222/370
[51] Int. Cl.².......................................... A01C 7/18
[58] Field of Search ............ 111/77, 78, 80, 34, 71; 222/370, 345

[56] References Cited
UNITED STATES PATENTS
752,553   2/1904   Highers................................ 111/77
1,933,061  10/1933  Johnson............................... 111/77
2,901,150   8/1959  Matter................................ 222/370
3,221,949  12/1965  Dingus........................... 222/370 X Primary Examiner—Stephen C. Pellegrino
Attorney, Agent, or Firm—Ladas, Parry, Von Gehr, Goldsmith & Deschamps

[57] ABSTRACT

Means in a seed drilling machine for visual control of the seed rate desired for each unit of length travelled, comprising a control feeder disposed in the feed path between an adjustable seed feeder and a coulter. The control feeder has one or more pockets capable of control by the operator and said pockets are movable transversely of the seed path and operated by the driving wheel of the seed drilling machine or other soil-operated wheel at a speed which is adapted to the length of travel such that the number of seeds in the single pocket or more indicate to the operator how many are sown per unit of length travelled, for example, per meter.

1 Claim, 5 Drawing Figures

U.S. Patent  Oct. 7,1975  3,910,217

SEED DRILLING MACHINES

This is a continuation, of application Ser. No. 348,788 filed Apr. 6, 1973 now abandoned.

The present invention relates to a means which eliminates the time-consuming work and uncertainty hitherto arising in the adjustment and use of seed drilling machines. This is achieved by a means for visual control for correct sowing by the seed drilling machine of the required number of seeds per row.

The present invention gives the Research Division of the Department of Agriculture basis for new teaching of the correct seed rate for all plants where, the unspecific teaching of kilos per acre has previously been given as instruction.

From now on, agriculturists and market gardeners who acquire a seed drilling machine equipped with the said means will have a real possibility of sowing the correct number of seeds capable of germinating per meter of row at determined row spacing. This is of decisive economical significance in sowing seeds of small and irregular shape and varying sizes of the same type or sort. For instance, such seeds as carrots, onions, lettuce and similar plants. If the seeds are sown too thinly, only a small yield is obtained and if they are sown too thickly, it is necessary to harrow them up again or pay extra for thinning. In both cases, greater costs are entailed for expensive seeds and, at the same time, the yield may be smaller and of poorer quality.

Conventional seed drilling machines have the common feature that when the seeds leave the feeding member they fall directly into the sowing tube or are conveyed to a seed distributor which distributes the seed to all seed tubes for passage to the coulters. Common to all these machines is the fact that the seed rate must be determined by rotation tests (a driving wheel is rotated while the machine is stationary) or by driving tests with collection and weighing of the seed. This is undertaken quite simply by hanging a control bag on the counter or somewhat farther forward in the path of the seeds. The correct seed rate in numbers of seeds per meter of row depends, inter alia, on the weight of the seed per 1,000 seeds and on the germination capability of the seed. For a single seed drilling machine the rate of seed depends on the size assortment, shape and germination capability of the seed. The last said type of machines are dependent as a rule on correct driving speed.

The present invention is characterized in that a pocket or container is arranged in the seed path between the feeding member and coulter on the seed drilling machine, said pocket being movable, by expedient transmission from the driving wheel of the drilling machine, transversely of the seed path at a speed which is adapted to the driving speed such that the pocket, on passing the seed path, collects seed during the period of time the drilling machine advances one unit of length, for example, 1 meter. The location of the said means depends on the type of machine. On conventional seed drilling machines without seed distributors, it must be disposed between the feeder member and the coulter. On machines provided with seed distributors, it must be disposed between the seed distributor and the coulter, or between the feeder and the seed distributor.

The most expedient method is to arrange a continuous row of pockets or containers which, may be moved consequently transversely of the seed path. The operator may then at all times control the sowing, and the pocket, after receiving seeds, travel to an opening where the seeds in the pocket are discharged into the seed channel to the coulter.

A preferred embodiment is characterized in that the pockets or containers are in the shape of upwardly and downwardly open sectors of a circle which are rotatable about the center of the circle and that the pockets, at their lower edge, bear against a plane plate with an opening for passage of seeds. This plane plate forms the bottom of the pockets and the seeds remain in the pocket until the pocket is brought above the outlet opening from the seed channel to the coulter. An alternative embodiment for conducting the seeds from the means to the coulter is to collect the seeds in a container beneath the outlet from the means. In this case, the seed drilling machine must be provided with a feeder member or a seed distributor having one outlet more than the number of coulters. A means with container for collecting the seed may be preferable when sowing carrots, onions, lettuce and other small plant seeds.

In the following, the invention is further described with reference to the drawing which illustrates the means, arranged in various ways, in connection with seed drilling machines.

Figure 2:
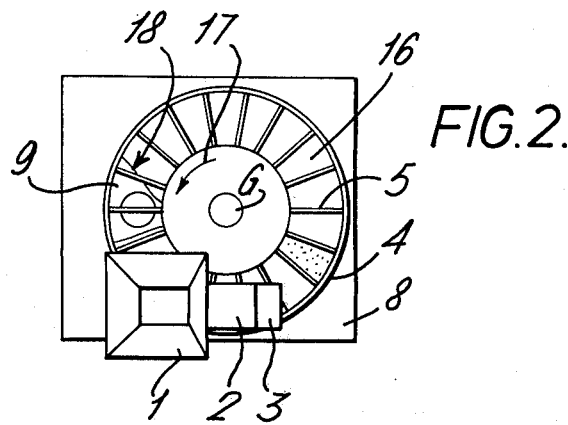

On FIGS. 1 and 2, 1 signifies a collecting funnel which receives the seed from a feeder or an outlet from a seed distributor (not illustrated). From the funnel 1, the seed is conveyed through a tube 2 to an elbow bend 3, from which the seeds fall into a circular control feeder 4 which is divided into pockets or containers by means of partition walls 5. The said circular control feeder 4 is operated by the driving wheel of the seed drilling machine above a conical gear transmission 6 which rotates a shaft 7 mounted in a stationary base plate 8 provided with an inclined aperture 9, through which the seeds fall into a funnel 10, to a coulter for direct sowing, or to a container for collection and control for the seed rate, or to a seed distributor (see FIG. 3) which distributes the seed to the coulters.

The location of the control feeder depends on the type of seed drilling machine to which it is to be mounted. In conventional seed drilling machines without seed distributors, it must be disposed between the feeder member and the coulter. On machines provided with seed distributors, it must be disposed between the seed distributor and the coulter or between the feeder and the seed distributor.

Figure 4:
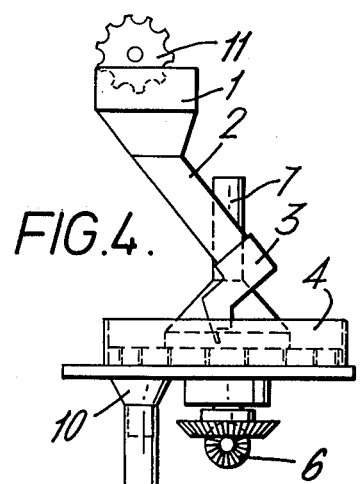
Figure 3:
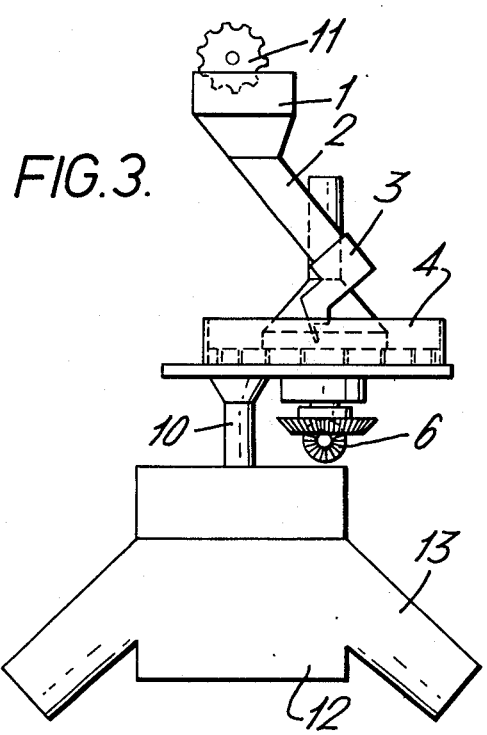
Figure 5:
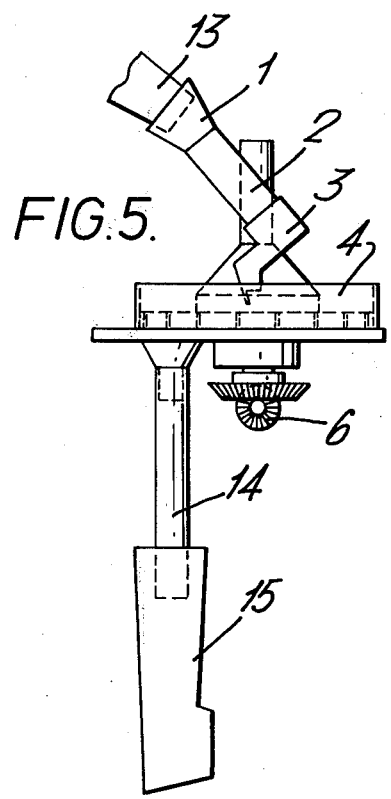

FIGS. 3, 4 and 5 illustrate examples of the said disposition.

On FIG. 3, 11 signifies a seed feeder from a seed container not shown. The control feeder 4 is here arranged between the said seed feeder 11 and the seed distributor 12 with outlet 13 to the coulters.

FIG. 4 illustrates in diagram a machine without seed distributor and here the seed passes from the control feeder 4 into a tube 14 to a coulter 15.

In FIG. 5, the control feeder 4 is arranged to the rear of an outlet 13 on a seed distributor 12. A pocket in the control feeder is signified by 16.

The rate of transmission for operation of the control feeder must be adapted such that it travels the distance of a partition wall, the seed drilling machine travelling one meter, or other known unit of length, for example, a foot. The control feeder and seed feeder must be interconnected by a driving wheel or another soil dependent wheel so that the velocities of both are proportional and dependent on the path of travel. The driving velocity will not then influence the number of seeds in the pocket in the control feeder and thereby the number of seeds sown per unit of length.

The correct rate of seed is achieved by adjusting the seed feeder 11 such that the number of seeds falling into each pocket 16 between the partition walls 5 corresponds to the number of seeds it is desired to sow per unit of length. During the sowing, the partition walls 5 move the seeds over the stationary base plate 8, the control feeder rotating in the direction of the arrow 17, and the seeds fall with good distribution into the funnel 10 due to the inclined side edge 18 in the aperture 9. From the funnel 10, the seeds pass to a coulter 15 or a seed distributor 12. As described hereinabove, the seeds from the control feeder may be controlled into a container.

With the means according to the invention, the adjustment and control of the seed rate from a seed drilling machine is extremely simple. The seeds are disposed in the pockets 16 between the partition walls 5 and may readily be counted and permit adjustment and adaption of the machine such that the desired seed rate is achieved.

A further suitable embodiment (now shown) of the control feeder is to arrange the pockets on an endless belt which runs over two guide rollers.

A third alternative (not shown) is a single pocket or cup which, by means of a suitable transmission mechanism, is automatically connected and disconnected to and from the seed flow between a feeder member and a coulter corresponding to a given length of travel.

Having described my invention, I claim:

1. A seed drilling machine including a control feeder, means for feeding seeds at a metered rate to said control feeder and discharge means disposed below said control feeder to receive seeds from an outlet in the underside of the control feeder by gravity and deliver said seeds for sowing, said control feeder comprising a plate, an opening in said plate leading to said discharge means and a circular drum having a plurality of pockets disposed around the periphery thereof, each said pocket providing a seed receiving compartment having an open top with the compartment interior visible to an operator of the machine and being defined by upstanding partition walls extending radially to the drum periphery, said drum being axially rotatable by a drive linkage from a ground wheel to displace the drum compartments sequentially into and out of a seed receiving position beneath said seed feeder and simultaneously to sweep the lower edge of each partition wall over said plate and convey seeds within said pockets to said plate opening, whereby seeds metered from said seed feeder can be visibly observed in said control feeder before gravitationally entering said discharge means and hence provide an indication as to how many individual seeds are sown per unit length.

* * * * *